H. PARKER.
NUT LOCK.
APPLICATION FILED NOV. 24, 1917.
1,308,505.
Patented July 1, 1919.
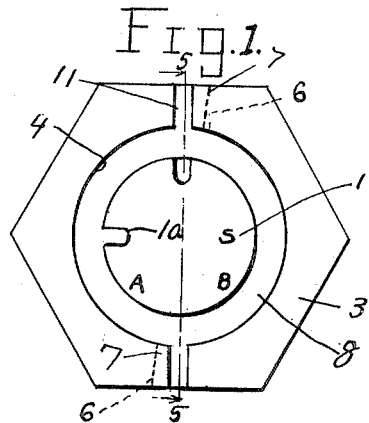
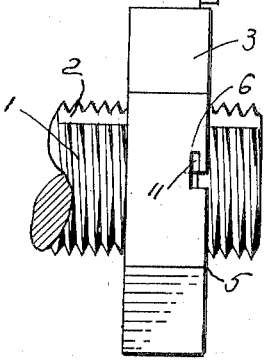
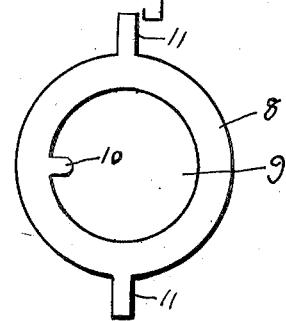
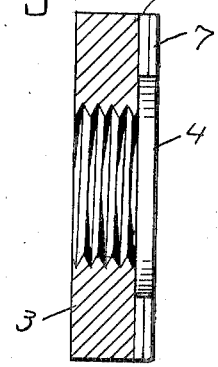
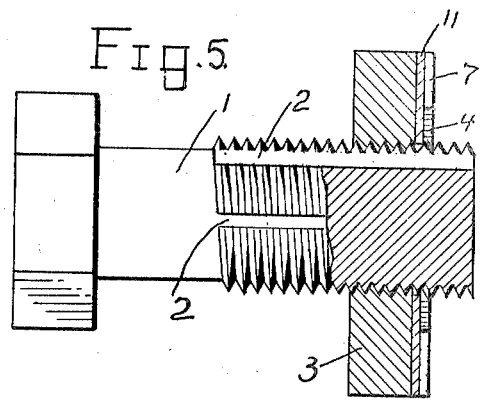
INVENTOR
Harold Parker
WITNESSES
By
ATTORNEY

UNITED STATES PATENT OFFICE.

HAROLD PARKER, OF HARTFORD, WISCONSIN.

NUT-LOCK.

1,308,505.  Specification of Letters Patent.  Patented July 1, 1919.

Application filed November 24, 1917. Serial No. 203,757.

*To all whom it may concern:*

Be it known that I, HAROLD PARKER, a citizen of the United States, residing at Hartford, in the county of Washington and State of Wisconsin, have invented certain new and useful Improvements in Nut-Locks, of which the following is a specification.

My invention relates to new and useful improvements in nut locks and has for its object, to provide means whereby the nut will be prevented from becoming loose or disengaged with the bolt. This is accomplished by providing a nut having grooves and a recess therein to receive a washer to fit the same, the washer being further provided upon its inner periphery with an inwardly projecting extension to engage one of the recesses in the bolt.

Another object of my invention is to provide means whereby the nut may be locked in every one eighth turn or every 45°.

Other objects and advantages will be apparent during the course of the following description.

In the accompanying drawing forming a part of the description and wherein like numerals are employed to designate like parts throughout the same, Figure 1 is a top plan view of my invention in assembled and unlocked position.

Fig. 2 is a side view of the same in locked position.

Fig. 3 is my improved washer.

Fig. 4 is a vertical sectional view of the nut taken on the same line as 5—5, and Fig. 5 is a vertical sectional view taken on the line 5—5.

In the drawings wherein is shown a preferred example of my invention, the numeral 1 designates the usual bolt having a pair of longitudinal grooves 2 extending the entire length of the threaded portion of the bolt. These grooves, if projected to the center of the bolt would join each other and extend at right angles to one another.

I wish it to be understood that any shaped nut may be used in connection with the lock, but in this case, I have used for illustration, a hexagonal nut 3 having a central threaded opening therethrough. In the top of this nut I provide a circular recess 4 which entirely surrounds and communicates with the thread opening through the nut. Communicating with this circular recess 4, upon the opposite sides of the nut are a pair of L shaped grooves 5, the angular portions 6 of the grooves 5 being adapted to extend in opposite directions, for a purpose which will be hereinafter set forth. By the provision of these L shaped grooves, an overlapping portion 7 is formed upon the nut, and prevents the displacement of the washer when the nut is in locked position.

Adapted to be received in the recess of the nut, is a circular washer 8 having a central opening 9 therethrough for the reception of the threaded end of the bolt. Upon the inner periphery or edges of the opening, an extension 10 is formed from the washer, and is adapted to enter one of the grooves 2 in the bolt when the washer is placed thereon. The washer is further provided with a pair of extensions 11, arranged upon the outer periphery thereof and are arranged oppositely of each other and in alinement. These extensions are adapted to lie within the grooves 5 when the washer is placed in the circular recess in the nut, and when in locked position the extensions are received in the angular portions 6 of the L shaped recesses. In this position the nut is prevented against further rotation and the overlapping portions 7 will prevent the washer from becoming disengaged from the nut and bolt.

To apply this nut lock, the bolt is passed through the work, and the nut 3 screwed down into engagement with the work. The washer 8 is then placed upon the bolt so that the extension 10 fits in one of the grooves 2 of the bolt, and is passed downwardly of the bolt so that the circular body portion of the washer seats itself in the recess 4 in the nut. It will be seen that the extensions 11 will lie in the recess 5 in the nut, as is more clearly shown in Fig. 1. The nut is then turned back a fraction of a turn so that the extensions 11 are received in the angular portions 6 of the recess 5, and the overlapping portions 7 are directly above the extensions 11. It will be seen that any further backward turn of the nut will be prevented by the extensions 10 engaging with grooves 2 in the bolt, and the extensions 11 engaging the walls 6 of the angular portions of the L shaped recess 5.

To remove the nut from the bolt, the nut is turned a fraction of a turn forward so that the extensions 11 are entirely disengaged with the overlapping portions 7. It will then only be necessary to insert a suitable tool or point under the extensions 11 and raise the washer out of engagement with the recess 4 and the bolt. By simply using one extension 10 on the inner periphery of the washer in connection with the two grooves in the bolt, it will be understood that by reversing the washer when necessary, the nut may be securely locked at every eighth turn or every 45°. To illustrate my point, suppose one of the grooves 2 was positioned at point S, indicated in Fig. 1, then it would only be necessary to reverse the washer so that the extension 10 would fall at point S, in order to lock the nut. To show the advantage of one inside extension over two, let $a$ and $b$ represent the positions of the grooves 2 of the bolt. In order to lock the nut using a washer with two inside extensions, it would be necessary to turn bolt to facilitate B being positioned at upper groove 2 and A at S, while the use of one inside extension, as shown, facilitates the locking of the nut, by simply turning the bolt so that the point B is arranged over the point S.

It is to be understood that the form of my invention herewith shown and described is to be taken as a preferred example of the same and that various changes in the shape, size, and arrangement of parts may be resorted to without departing from the spirit of the invention or the scope of the subjoined claim.

Having described my invention, I claim:

A nut lock including a bolt having a pair of longitudinal grooves therein, said grooves being positioned coincident with lines setting off a quadrant upon a cross section of the bolt, a nut having an annular recess in the top thereof around the threaded opening therethrough and communicating therewith, said nut being further provided with a pair of oppositely arranged L shaped grooves communicating with the annular recess therein, and a washer adapted to fit in said annular recess in the nut and provided upon its outer periphery with oppositely arranged extensions to be received in the L shaped grooves, said washer being further provided upon the edge of the central opening therethrough with a single inwardly extending extension to fit one of the grooves in the bolt, said extension being arranged at right angles to said oppositely disposed extensions for the purpose set forth.

In testimony whereof I affix my signature in presence of two witnesses.

HAROLD PARKER.

Witnesses:
 E. F. RUSSELL,
 THOMAS J. F........